United States Patent [19]

Lybolt

[11] Patent Number: 4,463,979
[45] Date of Patent: Aug. 7, 1984

[54] BUILDING BLOCK HANDLING TOOL

[76] Inventor: Arden F. Lybolt, Rte. 2, Tunkhannock, Pa. 18657

[21] Appl. No.: 493,826

[22] Filed: May 12, 1983

[51] Int. Cl.³ .............................................. B65G 7/12
[52] U.S. Cl. ................................................... 294/62
[58] Field of Search .................... 294/62, 97, 93, 115, 294/31, 16

[56] References Cited

U.S. PATENT DOCUMENTS 2,808,286 10/1957 Lyon ..................................... 294/62
3,006,679 10/1961 Gray ..................................... 294/62

Primary Examiner—James B. Marbert
Attorney, Agent, or Firm—Edmund M. Jaskiewicz

[57] ABSTRACT

A device for handling a cored building block has a substantially U-shaped body portion which is inserted into the core of a building block such that the curved base and one end of a leg exert opposing forces on the wall of the core when an upward lifting force is applied to a handle attached to the other leg of the body portion and positioned substantially horizontally in the lifting position. A modification includes a U-shaped body portion, one leg of which is longer than the other and the legs are straddled over a wall separating cores of a building block to exert forces on the wall when an upward lifting force is applied to a handle attached to the curved base of the body portion.

8 Claims, 8 Drawing Figures

U.S. Patent  Aug. 7, 1984  Sheet 1 of 2  4,463,979
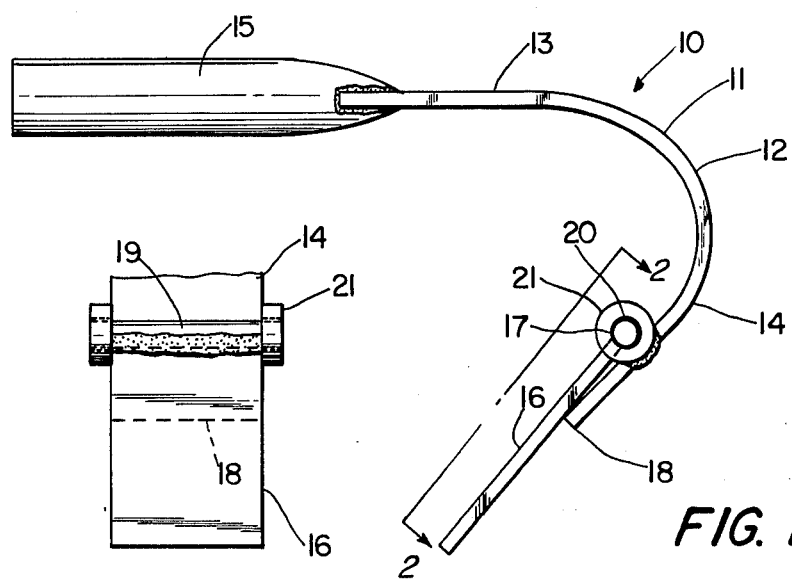
FIG. 1
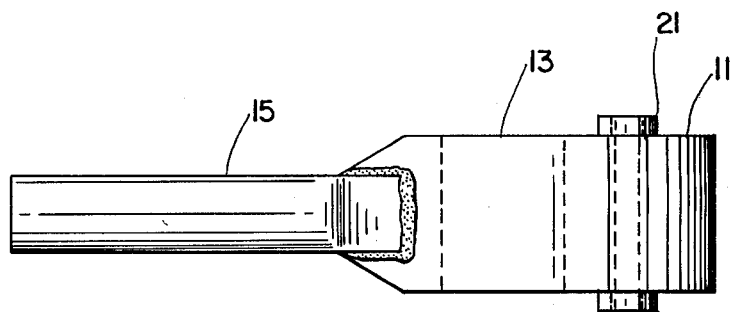
FIG. 2
FIG. 3
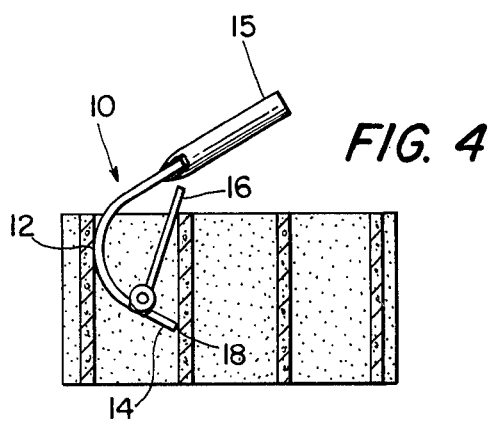
FIG. 4
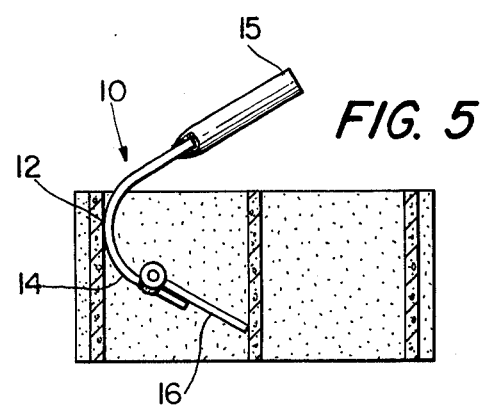
FIG. 5

4,463,979

BUILDING BLOCK HANDLING TOOL

The present invention relates to a device for handling a building block and the like, more particularly, to a tool which may be positioned within the core of a building block or straddling the walls separating cores of the building block when lifting a block.

A problem which is commonly encountered in the building industry is the handling of building blocks which are usually made of concrete or cinders and which are provided with a plurality of cores. The weight and rough surfaces on these building blocks deter the use of bare hands and even when the hahds are protected by gloves, the gloves are susceptible to rapid wear.

Various forms of lifting or handling tools have been devised. These tools generally have a structure which is inserted into a core of the block and exerts a force on the core walls so as to permit lifting of the building block. However, most of these tools are rather complicated in structure, present difficulties in use and sometimes become so wedged in the core that the block is damaged when the tool is removed.

Another form of handling tool comprises a structure which fits over a wall of the building block. However, such tools also are complicated in structure or are so specialized in their construction that the use of such tools does not significantly facilitate the work of persons handling the building blocks.

It is therefore the principal object of the present invention to provide a novel and improved tool for handling a building block and the like.

It is another object of the present invention to provide such a tool which can be readily inserted into the core of a building block and exert sufficient force against the walls of the core to permit lifting of the block without damaging in any way the block.

It is a further object of the present invention to provide such a tool which can easily and securely straddle a wall of a building block to permit easy lifting of the building block.

It is an additional object of the present invention to provide such a tool which is simple in construction, reliable in operation, easy to use and capable of long periods of use without becoming inoperative or damaging the building block.

According to one aspect of the present invention, such a device or tool for handling a building block may comprise a substantially U-shaped rigid body portion having a curved base and a pair of legs diverging therefrom at about a 45° angle. A handle extends longitudinally from an end of one leg.

In the lifting position of the tool, the handle is substantially horizontal and the body portion and the other leg are inserted into a core of the building block such that the curved base of the body portion and the end of the leg within the core exert opposing forces on opposite walls of the core upon application of a lifting force to the handle. The leg within the core is also provided with a pivotable lever so as to extend the length of the leg and to permit the tool to be used with building blocks having larger sized cores.

A modification is also disclosed in which the tool has a substantially U-shaped rigid body portion with parallel legs of unequal length. The ends of the legs are provided with inwardly directed flanges which are so spaced that a wall of a cored building block can be received between the flanges. There is a handle extending from the curved base portion of the body portion.

Other objects and advantages of the present invention will be apparent upon reference to the accompanying description when taken in conjunction with the following drawings, which are exemplary, wherein;

FIG. 1 is a side elevational view of the building block handling tool according to the present invention;

FIG. 2 is a plan view viewed in the direction of the arrows 2—2 of the pivotal lever on the end of a leg;

FIG. 3 is a top plan view of the handling tool of FIG. 1;

FIG. 4 is a side elevational view of the handling tool in lifting position in a building block which is shown in section;

FIG. 5 is a view similar to that of FIG. 4 but showing the lifting tool in position in a larger size core;

Proceeding next to the drawings wherein like reference symbols indicate the same parts throughout the various views, a specific embodiment and modification of the present invention will be described in detail.

Figure 6:
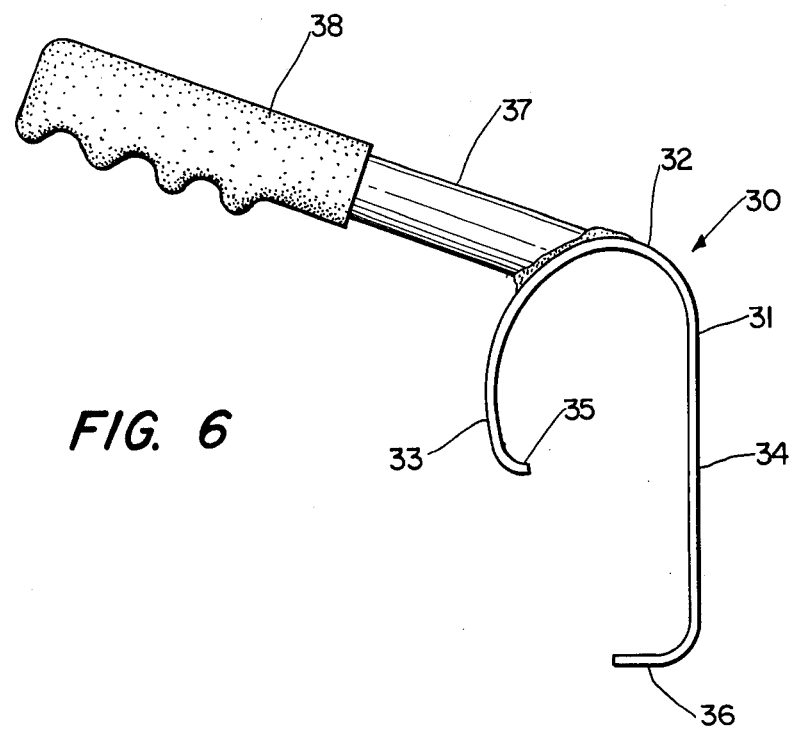
FIG. 6 is a side elevational view of a modification of the handling tool of the present invention.

In FIG. 1, there is indicated generally at 10 a building block handling tool, according to the present invention, which comprises a rigid U-shaped body portion 11 formed of a strip of hot rolled steel having a width of about two inches and a thickness of about 3/16 of an inch, which is formed into substantially a U-shape, having a curved base 12 and legs 13 and 14 diverging from the curved base at an angle of about 45°. A handle 15 which comprises a steel tube having an outer diameter of about one inch is welded to the end of the leg 13 so as to extend longitudinally therefrom. Other forms of a handle can be used such as providing a plastic or rubber grip on the tube with grooves for fingers.

The leg 14 is approximately the same length as leg 13. On the inner surface of the leg 14 a lever 16 has one end 17 which is pivotably mounted to the leg 14 at a point inwardly of the end 18 of the leg. The pivot joint is formed by a pin 19 which is welded to the end of lever 16 with the ends of the pin 19 being received into openings 20 formed in circular eyes or brackets 21 which are welded to the edges of the leg 14 as may be seen in FIGS. 1 and 2. The lever 16 is formed of the same material as the body portion 11 and is preferably of the same width as the body portion.

When the lever 16 is in the extended position wherein the lever is lying flat against the leg 14 as shown in FIG. 1 the length of the leg 14 is extended. This extension of the leg 14 enables the handling tool to be used with different size cores in building blocks as will be presently described.

When the tool 10 is used to lift a three-core building block as shown in section in FIG. 4, the end of leg 14 and the curved base 12 are inserted into the core as illustrated As the leg 14 is inserted into the core, the lever 16 will pivot upwardly into the position as shown in FIG. 4 so that the end 18 of leg 14 engages one wall of the core and the curved base 12 engages the opposing wall of the core as also shown in FIG. 4. When a substantially vertical lifting force is applied to the handle 15 when the tool is in the lifting position as shown in FIG.

4, the weight of the building block will cause the curved base 14 and leg end 18 to exert opposing forces such that the block can be readily lifted.

When the handling tool is to be used with a two-core building block as shown in FIG. 5, the size of the core will be greater which will require the extending of the lever 16 into the position as shown in FIG. 5 such that the end of lever 16 will engage one wall of the core and the curved base 12 will engage the opposite wall of the core. Subsequently, when a vertical lifting force is applied to the handle of the tool in FIG. 5, the building block will be lifted in the same manner as described with respect to FIG. 4.

It is to be noted that the length of the lever 16 is such that a major portion of the lever extends outwardly beyond the end 18 of leg 14 when the lever 16 is in the extended position as shown in FIG. 1.

In FIG. 6 there is illustrated a modification of the present invention which is indicated generally at 30 and comprises a rigid body portion 31 formed of a flat strip of hot rolled steel of the same dimensions as the body portion 11 in FIG. 1. The body portion 31 is substantially U-shaped and comprises a curved base 32 from which extend parallel legs 33 and 34 which are of unequal lengths in that the leg 34 is substantially twice as long as the leg 33. At the end of leg 33 is a inwardly projecting flange 35 and at the end of leg 34 is an inwardly projecting flange 36. The lengths of these flanges 35 and 36 are such that there is a sufficient space between the ends of the flanges to accommodate a core wall of a building block as shown in FIG. 8.

A handle 37 is welded to curved base 32 so as to extend at an angle of approximately 20° above the horizontal when the body portion 31 is in a vertical position. The handle 37 is similarly comprised of a steel cylinder having a rubber or plastic hand grip 38 thereon.

Figure 8:
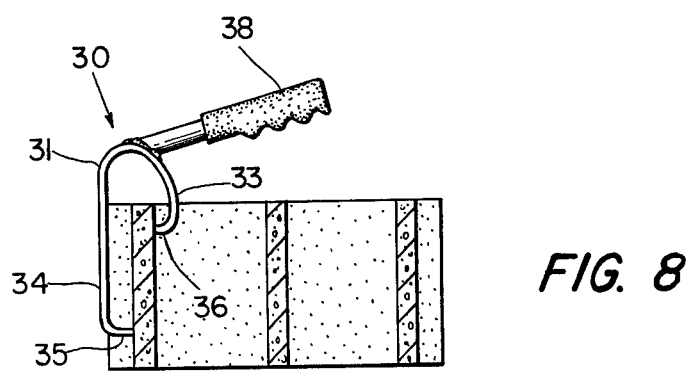
FIG. 8 is a side elevational view of the modification tool of FIG. 6 in lifting position in a building block which is shown in section.

Use of the modification handling tool is shown in FIG. 8. The body portion 31 is positioned to straddle a core wall of a building block, preferably the end wall, and the handle is positioned so as to be directed toward the center or major portion of the block as also shown in FIG. 8. When a vertical lifting force is applied to the handle, the downward weight of the block will exert frictional forces against the ends of the flanges 35 and 36 which engage opposite sides of a core wall as shown in FIG. 8. The result is a secure grip of the block by the handling tool and block can be readily manipulated so as to carry the building block as may be desired.

Disengagement or release of the handling tool from the buildihg block requires merely a slight clockwise pivoting of the tool and then a lifting of the release tool from contact with the building block.

Figure 7:
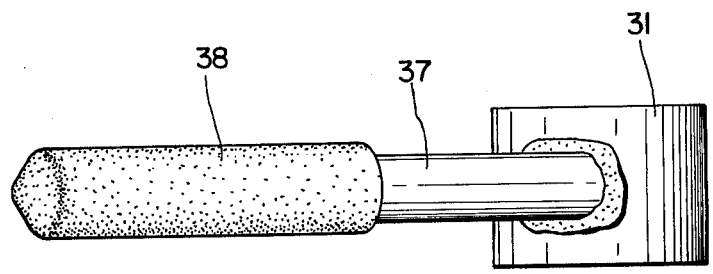
FIG. 7 is a top plan view of the modification of FIG. 6.

It will be apparent that the modification tool of FIG. 6-8 can be used with building blocks of various numbers of cores since the tool engages only a core wall.

Thus it can be seen that the present invention has disclosed a tool for handling concrete or cinder building blocks having two or three cores. The handling tool is easily used and requires a minimum of time to engage with and to be disengaged from a building block. The handling tool is simple and rugged in construction and the pivotal mounting of the extension lever on the handling tool is of such a simple and rugged construction that the lever is capable of long and hard operation.

It will be understood that this invention is susceptible to modification in order to adapt it to different usages and conditions, and, accordingly, it is desired to comprehend such modifications within this invention as may fall within the scope of the appended claims.

What is claimed is:

1. A device for handling a building block and the like comprising a rigid body portion comprising a substantially U-shaped having a curved base and a pair of legs of substantially equal length diverging therefrom at substantially a 45° angle, a handle extending longitudinally from an end of one of said legs, said handle being substantially horizontal and the other of said legs curving downwardly in the lifting position of the device, the length of said legs being such that the outer surface of the curved base and the end of said other leg engage opposed walls of said core, when said body portion and said other leg are inserted into a core of a building block and the handle is directed toward the center of the building block whereby the curved base of said body portion and the end of said other leg exert opposing forces on opposite walls of said core upon application of a lifting force to said handle.

2. A device as claimed in claim 1 and further comprising means at the end of said second leg for colinearly extending the length of said second leg to enable said curved base of the body portion and the extended second leg to exert opposing forces on the opposite walls of a larger size core.

3. A device as claimed in claim 2 wherein said extending means comprises a lever pivotably mounted on the inner surface of said second leg inwardly of the end thereof and having such a length that said lever extends beyond said end when said lever is in a flat position upon said second leg.

4. A device as claimed in claim 3 wherein said lever is pivotably mounted at an end thereof.

5. A device as claimed in claim 3 wherein the major portion of the length of said lever extends outwardly of the end of said second leg.

6. A device as claimed in claim 3 wherein said lever has the same width as said body portion.

7. A device for handling a building block and the like comprising a rigid body portion comprising a substantially U-shaped strip having a curved base and first and second legs extending parallel therefrom, said first leg being longer than said second leg, an inwardly directed flange on the end of each said leg, the combined lengths of said flanges being less than the distance between said legs such that a wall of a cored building block can be received between said flanges, and a handle extending at a small angle above the horizontal from the curved base of said body portion in a direction toward the shorter second leg when said legs are positioned in a subtantially vertical direction to engage opposite surfaces of a wall in a cored building block.

8. A device as claimed in claim 7 wherein said first leg is about twice the length of said second leg.

* * * * *